(12) United States Patent
Duwaer et al.

(10) Patent No.: US 6,201,951 B1
(45) Date of Patent: Mar. 13, 2001

(54) TELEPHONE SET WITH A DETACHABLE CORDLESS CONTROL AND DISPLAY PANEL

(75) Inventors: Arne L. Duwaer, Eindhoven; Antonius J. M. Hafkamp, Doetinchem, both of (NL); Christian Krexner, Vienna (AU)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/302,133

(22) Filed: Sep. 7, 1994

(30) Foreign Application Priority Data

Sep. 10, 1993 (NL) .................................................. 09300949

(51) Int. Cl.$^7$ ............................... H04B 1/40; H04M 3/00
(52) U.S. Cl. .......................................... 455/74.1; 455/420
(58) Field of Search ............................... 340/173; 379/56, 379/58, 61, 96, 419, 428; 455/74.1, 420

(56) References Cited

U.S. PATENT DOCUMENTS

| | | | |
|---|---|---|---|
| 5,010,565 | * | 4/1991 | Nash et al. ............................... 379/61 |
| 5,020,090 | * | 5/1991 | Morris .................................... 379/58 |
| 5,054,115 | * | 10/1991 | Sawa et al. ............................. 455/89 |
| 5,127,050 | * | 6/1992 | Takahashi et al. .................... 379/428 |
| 5,138,649 | * | 8/1992 | Krisbergh et al. ..................... 379/56 |
| 5,183,404 | * | 2/1993 | Aldous et al. .......................... 439/55 |
| 5,231,381 | | 7/1993 | Duwaer . |

FOREIGN PATENT DOCUMENTS

| | | | |
|---|---|---|---|
| 0396190 | | 7/1990 | (EP) . |
| 0421025 | | 10/1991 | (EP) . |
| 000472361 | * | 2/1992 | (EP) ...................................... 379/58 |
| 0499012 | | 8/1992 | (EP) . |

OTHER PUBLICATIONS

PC Resource, p. 146 and p. 148, Mar. 1990.*
Popular Electronics, p. 22, Oct. 1994.*
S. Sheng et al, "Portable Multimedia Terminal", IEEE Communications Magazine, Dec. 1992, No. 12, pp. 64–75.
Japanese "Kokai" 3–76364 (A): Yamanaka, "IC Card Portable Telephone Set", pub. Aug. 17, 1989.
Japanese "Kokai" 4–86034 (A): Sueda, "Mobile Radio Telephone System", pub. Mar. 18, 1992.

* cited by examiner

Primary Examiner—William Cumming
(74) Attorney, Agent, or Firm—David R. Treacy

(57) ABSTRACT

The control panel of a telephone set is detachable from a base station portion of the set. The control panel and base station can communicate mutually cordlessly, or the control panel can be connected for communication independent of the cordless facility. The control panel includes an interactive display panel with a touch screen and a graphic tablet, and control electronics for the display panel. Telephone numbers, spoken and written messages can be transmitted via the touch screen with a finger, or via the graphic tablet with a special pen.

10 Claims, 2 Drawing Sheets

TELEPHONE SET WITH A DETACHABLE CORDLESS CONTROL AND DISPLAY PANEL

BACKGROUND OF THE INVENTION

The invention relates to a telephone set with a base station and a control panel detachable therefrom, the base station and the control panel comprising each a means for communicating with each other in a cordless manner.

Such a telephone set is known from EP-A-0396190. That publication describes a telephone set whose keypad for dialling telephone numbers can be detachably connected to both the base station and the operation panel. With prior-art telephone set it is possible to hold a conversation with both the base station and the operation panel, the keypad being optionally connectable to either.

Japanese Patent Application no. 62-110252 further discloses a telephone set with a detachable keypad, in which the keypad comprises an infrared send portion and the telephone set an infrared receive portion, so that it is possible for a person to dial a number while being remote from the telephone set.

Recently, telephone sets have been proposed comprising a display panel, for example, an LCD screen, with texts being displayed on the screen that relate to both a telephone call itself and to a list of names with the associated preselect keys, the number of the calling party, the called telephone number and so on, as well as information about service companies such as viewdata, mail order businesses, banks, travelling agencies and so on. Prior-art telephone set also includes an extensible alphanumeric keypad by which text can be input and displayed on the display panel. In this manner a simple communication with one of said service companies is possible. This prior-art telephone set is marketed by the Applicants under the name of Philips Enhanced Telephone.

Finally, EP-A-0421025 to which U.S. Pat. No. 5,231,381 has disclosed a data processing system consisting of a flat display panel which comprises a so-called touch-screen for inputting data with a finger and a graphic tablet for inputting data with a special pen. With this system it is possible to use a flat, compact unit both for inputting texts and/or figures into a computer with a special pen and inputting texts and data with a finger by touching a virtual keypad. Furthermore, the system can also display texts and figures. As a result, prior-art system is pre-eminently suitable for use as an interactive interface between a user and a (portable) personal computer.

SUMMARY OF THE INVENTION

It is an object of the invention to provide a telephone set which is user-friendly in a manner not achieved thus far with prior-art techniques being implemented.

For this purpose, the invention provides a telephone set of said type, characterized in that the control panel comprises an interactive display panel with a touch-screen and/or a graphic tablet and control electronics for the display panel.

Preferably, the display panel known from EP-A-0421025 is U.S. Pat No. 5,231,381 used as a display panel.

According to a preferred embodiment the control panel also comprises means for holding a telephone conversation, such as a microphone and a loudspeaker or headphone. Alternatively, however, it is possible to use a separate handset for holding a telephone conversation, which handset is connected in a cordless manner or not to the base station. If the control panel and the base station comprise each means for holding a telephone conversation and, for example, a loudspeaker and a microphone, it is possible to couple the display panel to the control panel, so that it can be detached, and arrange the base station in such a way that the display panel can also be coupled to the base station so as to be in the position to telephone via the base station while using the advantageous properties of the interactive display panel.

According to a further embodiment the control panel is suitable for use as a graphic answering machine, which means that a user can read from the screen a message left for him during his absence. A user, if seeking contact with another subscriber who possesses a similar telephone set, can also leave a written message behind in the absence of that subscriber instead of having to record a message, which recording meets with a psychological barrier with many users. A written message may be obtained by operating the virtual keypad or be written by hand or, if the telephone set comprises a means for handwriting recognition, be written by hand and converted into block letters by the telephone set.

According to yet another embodiment the control panel is also suitable for operation as a remote control for audio or video equipment or remote control for other equipment, such as lights, doors and so on, the display panel displaying a virtual control panel of which the user can touch the keys or controllers with a pen or a finger. The base station or the control panel is then to comprise a means capable of communicating with the equipment to be controlled.

According to yet another embodiment the control panel is also suitable for functioning as a keyboard for a personal computer (PC), the control panel then combining the function of keyboard and display screen of a PC. The control panel may then comprise some form of mouse control for moving the cursor on the screen as desired. At the same time the base station is then to comprise all required intelligence and memory capacity of the PC.

It is observed that the telephone set according to the invention clearly distinguishes itself from the recently marketed Personal Digital Assistants (PDA), because a PDA is a complete device with a microprocessor and all relevant peripheral equipment in a housing, an extended memory, a display panel which may have the form of a touch-screen and so on. Such a PDA is extremely costly and rather bulky, whereas the control panel according to the invention comprises only the bare essential intelligence, memory and communication components and it is the base station that comprises all the intelligence, memory capacity and so on.

DESCRIPTION OF THE PREFERRED EMBODIMENT

Figure 1:
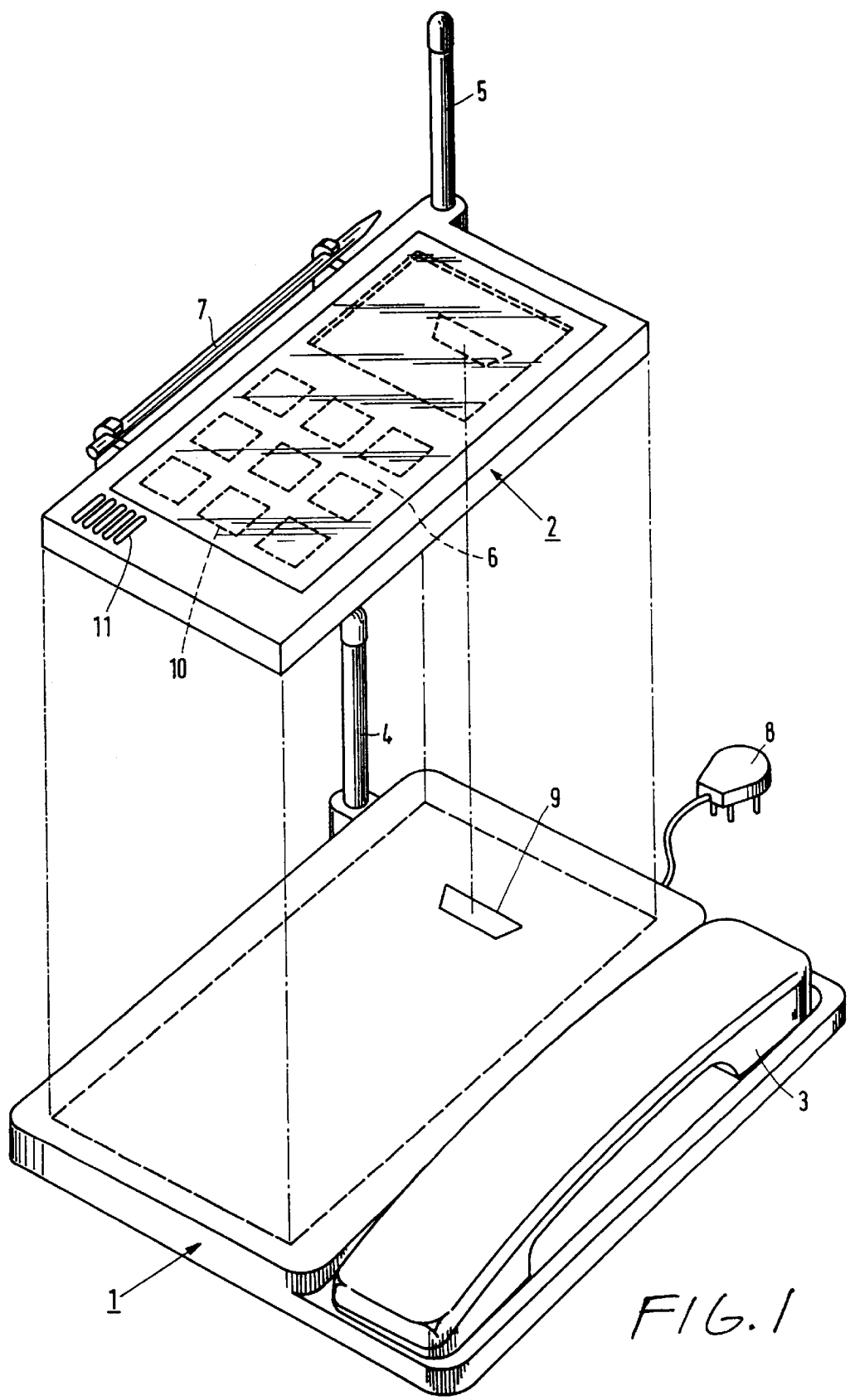
FIG. 1 is a diagrammatic view of a telephone set according to the invention.
Figure 2:
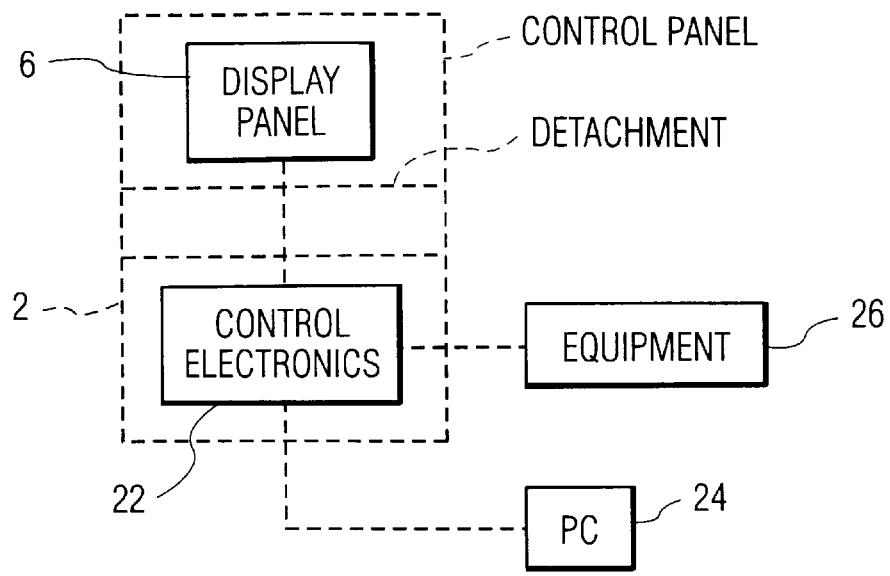
FIG. 2 is a schematic diagram showing the control electronics and detachability for the set.
Figure 3:
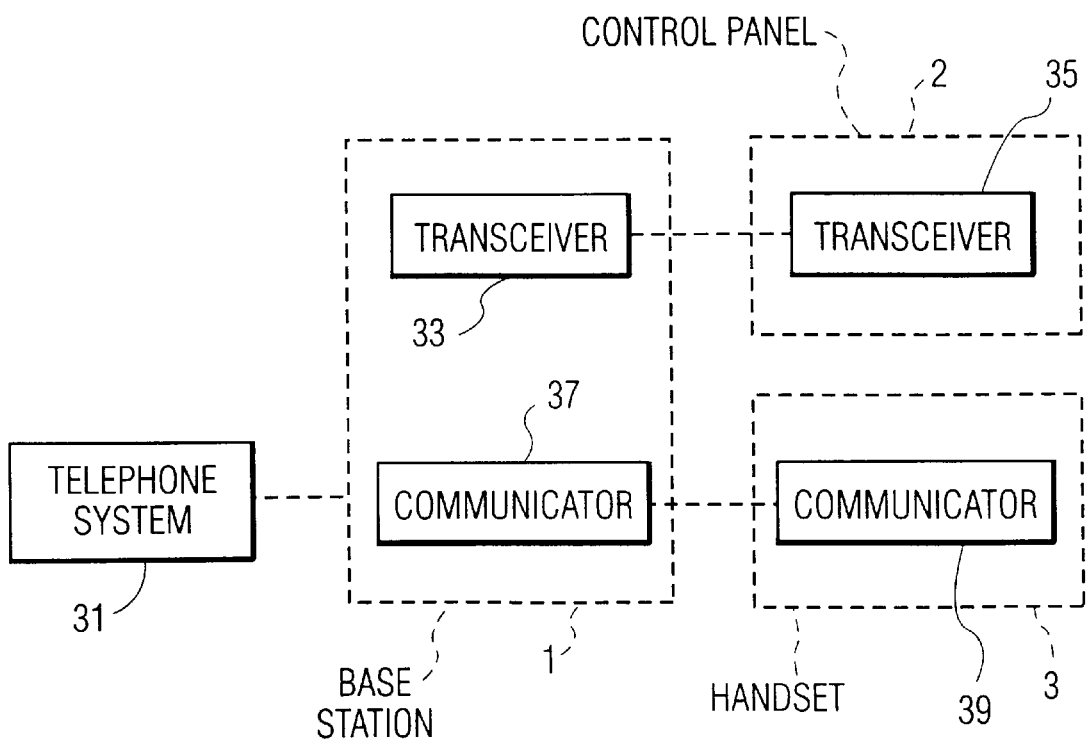
FIG. 3 is a schematic diagram showing the communication to a telephone system and the handset.

In the drawing Figure, reference 1 denotes the base station and reference 2 the control panel. The base station comprises a telephone receiver 3 and an aerial 4. In the interior of the base station a means is customarily arranged for letting the base station communicate with the telephone system 31, for which purpose the base station is connected to the telephone system, for example, a PABX or the public telephone network via a cable with a plug 8 and contains control electronics 22. If desired, the base station can also communicate in a cordless manner with a telephone system suitable for that purpose. Furthermore, the interior of the base station comprises a means such as a transceiver for communicating with the control panel 2 in a cordless manner via aerial 4 and a means, for example, a microprocessor, for processing the data or speech signals generated by this control panel and returning to the control panel either speech signals or other data generated by the base station or not, or supplying to the telephone system either data or speech signals, or storing them in a memory accommodated in the base station. All these means accommodated in the base station are known per se and described, for example, in said publications or known from other publications well known to those skilled in the art. Said means will thus not be described in detail, because they are unimportant to a proper understanding of the essence of the invention.

The control panel 2 comprises an aerial 5 for communication with the base station 1 and includes an interactive picture screen 6. The picture screen 6 is preferably of a type described in EP-A-0421025, but any other interactive picture screen which, in essence, is capable of displaying a virtual keypad and alphanumeric data can be used as such with the telephone set according to the invention. Preferably, an active pen 7 is provided, for example, for writing messages and operating the virtual keys 10, a plurality of these keys being diagrammatically shown on the screen 6 by way of example. The control panel 2 comprises not only screen 6, but also a means such as a transceiver 35 for communicating in a cordless manner with the base station 1 and a microphone/loudspeaker 11 for holding a telephone conversation via the control panel. In lieu of a loudspeaker 11, also a light headphone may be connected to the control panel 2, for example, when the facility is used for listening to tracks of compact discs before ordering them from a mail order service. A telephone conversation may also be held via the handset 3 which may also be arranged, as desired, for communicating in a cordless manner with the base station 1 via communicator means 37 and 39. If both the control panel 2 and the base station 1 are arranged for communication with a telephone system, such as a PABX or the public telephone network, it is advantageous to detachably connect the interactive display panel 6 to the control panel, so that the display panel can optionally be used in a manner as described in EP-A-0396190 by the control panel and the base station, by simply clipping the display panel thereto and thus realising the desired electrical connections.

From the foregoing it will be obvious that the invention provides a highly user-friendly, easy-operation telephone set which can be used according to needs only as a so-called feature telephone or also in more advanced embodiments as a remote control for a personal computer 24 or other equipment 26, PC and so on. The telephone set is highly convenient in that a user can input data or speech into the telephone set or can perceive data or speech generated by the set at the location wanted by the user, remote from the base station and in a position desired by him, for example, with the control panel on his lap in an armchair when teleservices are used, such as viewdata, or at his desk, with the control panel right in front of him, when signs or figures on the touch-screen are input by hand. Finally, it is possible to couple the control panel 2 via an appropriate connector on its rear side with a corresponding connector 9 on the base station 1, to operate the control panel there which is fed by the base station and charge the batteries (not shown). This connector may be, for example, a standardized RS232 bus as is used for connecting peripheral equipment of personal computers. This is especially convenient if the cordless connection between the base station and the control panel does not function for some reason (or does not function properly).

It will be evident to the expert that a telephone set with a control panel of the described type with an interactive picture screen knows a large number of other options than those described hereinbefore by way of example.

What is claimed is:

1. A telephone set including a base station and a control detachable therefrom, characterized in that:

the telephone set comprises means for communication between the base station and the control panel, operable independently of the detachment and movement of the control panel remotely from the base station, and the control panel comprises an interactive display panel including a touch screen and a graphic tablet, and control electronics for the display panel.

2. A telephone set as claimed in claim 1, characterized in that said means for communication is a cordless means.

3. A telephone set as claimed in claim 1, characterized in that said means for communication includes a cordless means for communication, and mechanical coupling means operable when the control panel is attached to the base station for transmission between the base station and the control panel independent of said cordless means.

4. A telephone set including a base station and a control panel detachable therefrom, characterized in that:

the telephone set comprises:

means for communication between the base station and the control panel, operable independently of the detachment and movement of the control panel remotely from the base station, and an interactive display panel including a touch screen, a graphic tablet, and control electronics, the base station comprises means for communicating with a telephone system, and the interactive display panel comprises means for detachably and selectively coupling electrically to the base station or the control panel.

5. A control panel for a telephone set including a base station, characterized in that:

the control panel comprises means for detachably connecting the control panel to the base station, and means for communication between the base station and the control panel, operable independently of detachment and movement of the control panel remotely from the base station, and the control panel comprises an interactive display panel including a touch screen and a graphic tablet, and control electronics for the display panel.

6. A telephone set as claimed in claim 1, characterized in that the control panel comprises a microphone and a loudspeaker for holding a telephone conversation via the control panel.

7. A telephone set as claimed in claim 1, characterized in that the control panel is arranged to operate as a graphic answering machine for receiving and transmitting written or typed messages.

8. A telephone set as claimed in claim 1, characterized in that the control panel is arranged to operate as a remote control for equipment.

9. A telephone set as claimed in claim 1, characterized in that the control panel is arranged to operate as a keyboard and display screen for a personal computer.

10. A telephone set as claimed in claim 1, in which the base station comprises a handset, characterized in that the handset comprises a means for cordless communication with a base station.

* * * * *